(12) United States Patent
Gong et al.

(10) Patent No.: US 8,514,592 B2
(45) Date of Patent: Aug. 20, 2013

(54) SYSTEM AND METHOD FOR POWER CONVERSION

(75) Inventors: Xiaowu Gong, Singapore (SG); Kok Kee Lim, Singapore (SG); Yong Siang Teo, Singapore (SG); Yi He, Singapore (SG); Winson Siew Teng Wong, Singapore (SG)

(73) Assignee: Infineon Technologies Austria AG, Villach (AT)

( * ) Notice: Subject to any disclaimer, the term of this patent is extended or adjusted under 35 U.S.C. 154(b) by 2 days.

(21) Appl. No.: 13/274,809

(22) Filed: Oct. 17, 2011

(65) Prior Publication Data

US 2012/0033458 A1    Feb. 9, 2012

Related U.S. Application Data

(62) Division of application No. 12/207,296, filed on Sep. 9, 2008, now Pat. No. 8,064,230.

(51) Int. Cl.
*H02M 3/335* (2006.01)

(52) U.S. Cl.
USPC ........................................ 363/21.09; 323/284

(58) Field of Classification Search
USPC ................... 363/21.04–21.11, 97; 323/285, 323/284
See application file for complete search history.

(56) References Cited

U.S. PATENT DOCUMENTS

| | | | |
|---|---|---|---|
| 4,837,495 A | 6/1989 | Zansky | |
| 5,309,344 A | 5/1994 | Smith | |
| 5,363,287 A | 11/1994 | Liu et al. | |
| 5,903,452 A * | 5/1999 | Yang | 363/97 |
| 5,909,362 A | 6/1999 | Adams | |
| 5,917,715 A | 6/1999 | Lee | |
| 6,067,241 A | 5/2000 | Lu | |
| 6,522,108 B2 | 2/2003 | Prager et al. | |
| 2003/0202364 A1 | 10/2003 | Lomax et al. | |
| 2007/0216391 A1 | 9/2007 | Blanken | |

\* cited by examiner

*Primary Examiner* — Harry Behm
*Assistant Examiner* — Matthew Grubb
(74) *Attorney, Agent, or Firm* — Slater & Matsil, L.L.P.

(57) ABSTRACT

A system and method for operating power supplies. A method comprises altering a current sense (CS) signal, turning off a switch of the converter in response to a determining that the CS signal is greater than or equal to a first threshold, and leaving on the switch of the converter in response to a determining that the CS signal is less than the first threshold.

26 Claims, 7 Drawing Sheets

SYSTEM AND METHOD FOR POWER CONVERSION

This is a divisional application of U.S. patent application Ser. No. 12/207,296, entitled "System and Method for Power Conversion" which was filed on Sep. 9, 2008 now U.S. Pat. No. 8,064,230 and is hereby incorporated herein by reference in its entirety.

TECHNICAL FIELD

The present invention relates generally to a system and a method for power supplies, and more particularly to a system and a method for operating power supplies.

BACKGROUND

Forward converter circuits and flyback converter circuits may be used in a number of consumer applications, such as fax machines, telephones, as well as power supplies for computers and other electronic devices. Generally, a forward converter uses a transformer to transfer energy directly between input and output in a single step. FIG. 1a is a diagram of a forward converter 100. The forward converter 100 includes a transformer 105 that may be used in converting an input alternating current (AC) voltage (Vin) to an isolated output voltage. The forward converter 100 also includes a switch 110. The switch 110 may be controlled by a GATE signal. The switch 110 may be implemented using a transistor. When the switch 110 is in an on state, Vin appears across the primary windings of the transformer 105, which may then generate a voltage Vx that may be expressed as:

$$Vx = \frac{N1}{N2} Vin,$$

where N1 and N2 are the number of turns in the primary windings and the secondary windings of the transformer 105, respectively. A first diode 115 on the secondary windings of the transformer 105 may help to ensure that only positive voltages reach the output of the forward converter 100. A second diode 120 may provide a discharge path for an inductor 125 when the transformer 105 has a zero or negative input voltage.

Rather than having an inductor (such as the inductor 125), a flyback converter may store energy in transformer during an on phase and then release the energy during an off phase. The energy storage may occur in a magnetization of the transformer's core. To help increase the stored energy, a gapped core may often be used. FIG. 1b illustrates a flyback converter 150.

FIG. 2a is a diagram illustrating several signals in a forward converter, such as the forward converter 100, wherein the forward converter 100 is configured for PWM operation. A trace 205 illustrates the behavior of a current sense (CS) voltage signal, which may be an indicator of a current being provided by the voltage supply or a current being provided to a load connected to the forward converter 100. The CS voltage signal may also be used to control the state of the switch 110. A signal (referred to herein as a pulse width modulation ramp (PWMRMP) signal and shown in FIG. 2a as a trace 210) may be an amplified version of the CS voltage signal and may also be used to control the state of a signal used to control the state of the switch 110 (the signal used to control the state of the switch 110 may be referred to herein as a GATE signal and shown as trace 215). In addition to being amplified, an offset may also be added to the CS voltage signal to produce the PWMRMP signal.

When the GATE signal becomes high, such as at time event 220, the switch 110 turns on and the input voltage Vin appears across the primary windings of the transformer 105, which in turn, generates a voltage Vx. When the switch 110 is turned on, the voltage Vx is generated and the CS voltage signal begins to ramp up. Similarly, the PWMRMP signal changes from substantially zero to a level 225 referred to as a PWM level or PWM offset voltage (this may correspond to an offset added to the CS voltage signal). The PWM level may be set during the manufacture of the forward converter 100 and generally is not changed during use. The CS voltage signal may begin at substantially zero and may ramp up to a threshold 230. When the CS voltage signal reaches the threshold 230, the GATE signal becomes low and the switch 110 turns off. The switch 110 turning off returns the CS voltage signal back to substantially zero.

Similarly, after starting at the level 225, the PWMRMP signal may increase until it meets or exceeds a threshold 232. The threshold 232 may correspond to a feedback (FB) signal, which may be based on an output provided to a load by the forward converter 100. As the PWMRMP signal exceeds the threshold 232 (the FB signal), such as at time event 235, the GATE signal becomes low and the switch 110 turns off. The switch 110 turning off returns the PWMRMP signal back to substantially zero.

When the forward converter 100 is operating under light load conditions, a feedback (FB) signal may be very low or very close to a built-in PWM level, which may typically be set during manufacture of the forward converter 100 and is generally not changed during use. This may correspond to a very low level for the CS voltage signal. A relationship between the CS voltage signal and a feedback voltage signal (a voltage signal that may be dependent on an output of the forward converter 100) may be governed by an equation expressible as:

$$PWMRMP = PWM\ Gain * CS + PWM\ Level,$$

where PWM Gain is an internally fixed gain value, CS is the CS voltage signal, PWM Level is the PWM offset voltage and is an internally fixed offset value, and PWMRMP is the PWM ramp signal. The switch 110 of the forward converter 100 may turn off when the PWMRMP signal reaches the level of the feedback voltage signal. Therefore, if the feedback voltage signal is at 0.856 V, PWM Gain is at 3.2, PWM Offset is at 0.6, then solving for CS, CS would be equal to 80 mV.

The low value of the CS voltage signal (for example, 80 mV) may make the forward converter 100 susceptible to noise. FIGS. 2b and 2c illustrate the effect of a low slew rate on noise susceptibility of the forward converter. FIG. 2b shows a trace 240 illustrating the GATE signal, showing at time event 245, the GATE signal resetting to a low value when a CS voltage signal (shown as trace 250 in FIG. 2c) reaches a threshold 255. However, if there is noise (shown as noise spike 260 at time event 265) present on the CS voltage signal, wherein the noise may be due to switching, the noise on the CS voltage signal may cause a detector (or a comparator) to incorrectly determine that the CS voltage signal has reached the threshold 255. The incorrect determination of the CS voltage signal reaching the threshold 255 may result in the GATE signal resetting to a low value.

As a result of the low slew rate, the GATE signal may jitter from a large duty cycle (shown as interval 270) to a small duty cycle (shown as interval 272) and so forth. The jittering in the GATE signal may produce audible noise. The audible noise may be exacerbated if the change in the duty cycle of the GATE signal changes rapidly from a large duty cycle to a small duty cycle.

FIG. 2d is a diagram illustrating signals in the forward converter 100. Pulse jittering in the GATE signal is shown in a trace 275, wherein the pulse jittering is shown as the dramatic differences in pulse widths in the GATE signal. A trace 280 illustrates the PWMRMP signal, wherein high frequency switching has introduced noise into the PWMRMP signal, such as noise spikes 285, 286, and 287. If a noise spike, such as the noise spike 285, has sufficient magnitude, the noise spike 285 at time event 290 may cause an erroneous detection of the PWMRMP signal meeting or exceeding the threshold 232 (the FB signal), thereby causing the GATE signal to become low and the switch 110 to turn off. Noise spikes may also be seen on the CS voltage signal, shown as trace 295. The noise on the CS voltage signal may also cause an erroneous detection of the CS voltage signal meeting or exceeding the threshold 230, thereby causing the GATE signal to become low and the switch 110 to turn off.

Additionally, a forward converter and/or a flyback converter may operate in several different operating modes, depending on the power requirements of a load attached to the converter. One such operating mode is a burst mode. The burst mode may typically be used during low load or no load conditions. As described previously, the CS voltage signal may be used to reset the state of a transistor, such as the switch 110. For example, when the CS voltage signal exceeds a threshold, the switch 110 may be reset. However, since there may be a delay between the time when it is detected that the CS voltage signal exceeds the threshold and when the switch 110 is actually reset, the CS voltage signal may continue to change (increase). The continued increase in the CS voltage signal may result in the CS voltage signal overshooting to different levels dependent on an input voltage. A higher input voltage may cause a higher overshoot in the CS voltage signal, which in turn may deliver a higher power and vice versa. With a difference in power between a high input voltage and a low input voltage, there may be either an undesired overshoot or a larger than expected undershoot of an output voltage when the load of the converter changes from burst mode back to normal mode.

SUMMARY OF THE INVENTION

These and other problems are generally solved or circumvented, and technical advantages are generally achieved, by preferred embodiments which provides a system and method for operating power supplies.

In accordance with a preferred embodiment, a method for operating a converter is provided. The method includes detecting an operating mode of the converter, altering a current sense signal based on the operating mode of the converter, and turning off a switch of the converter in response to a determining that the current sense signal is greater than or equal to a first threshold. The method also includes leaving the switch on in response to a determining that the current sense signal is less than the first threshold.

The foregoing has outlined rather broadly the features and technical advantages of the embodiments in order that the detailed description of the embodiments that follows may be better understood. Additional features and advantages of the embodiments will be described hereinafter which form the subject of the claims of the invention. It should be appreciated by those skilled in the art that the conception and specific embodiments disclosed may be readily utilized as a basis for modifying or designing other structures or processes for carrying out the same purposes of the invention. It should also be realized by those skilled in the art that such equivalent constructions do not depart from the spirit and scope of the embodiments as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely a forward converter power source for use in a computer. The invention may also be applied, however, to forward converter power sources for other electronic devices, such as fax machines, telephones, as well as other consumer electronic devices. Additionally, the invention may be applied to flyback converter power sources.

Figure 1A:
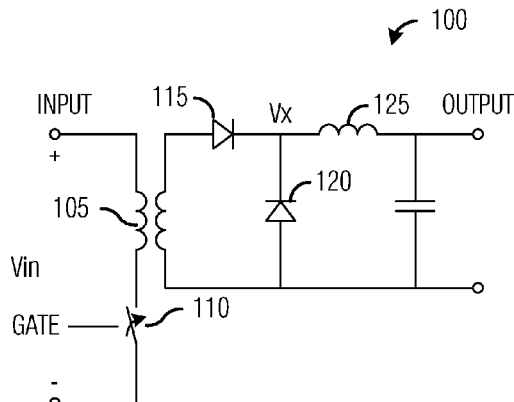
FIG. 1a is a diagram of a forward converter.
Figure 1B:
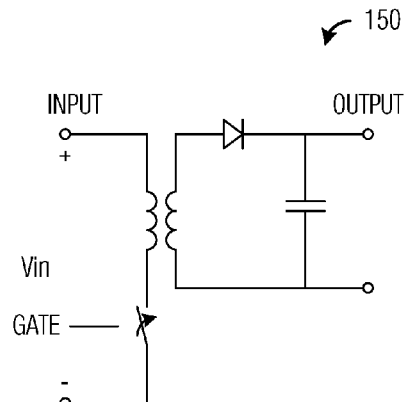
FIG. 1b is a diagram of a flyback converter.
Figure 2A:
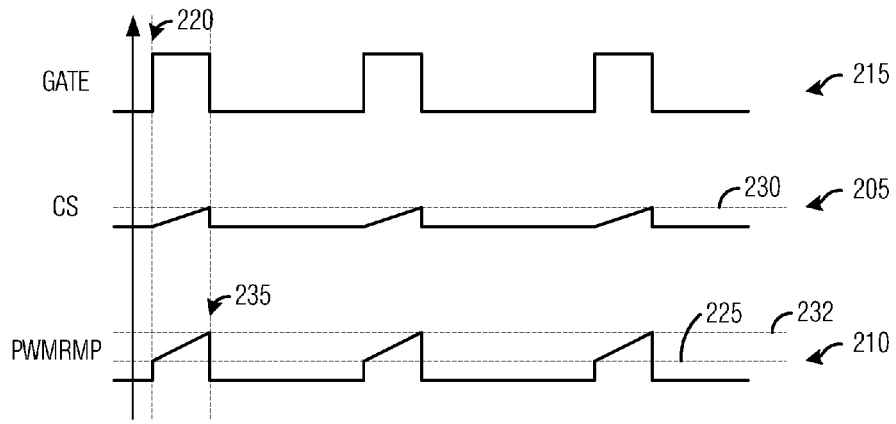
FIG. 2a is a diagram of signals in a forward converter.
Figure 2B:
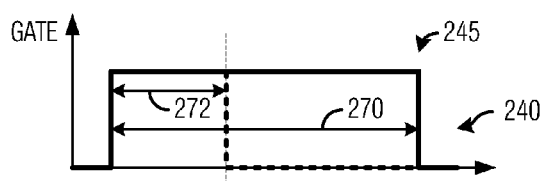
FIGS. 2b and 2c are diagrams illustrating the noise susceptibility of a low slew rate of a CS voltage signal.
Figure 2C:
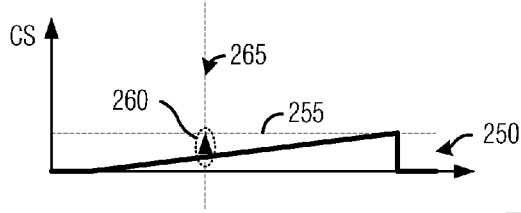
Figure 2D:
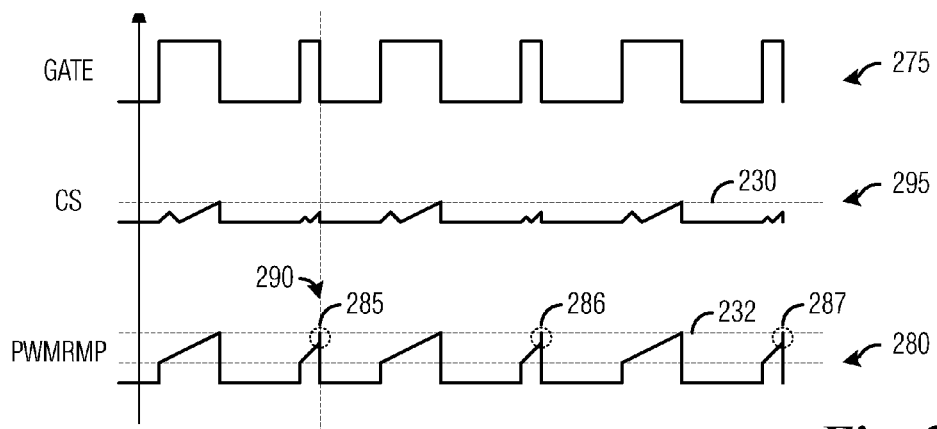
FIG. 2d is a diagram of signals and noise in a forward converter.
Figure 3:
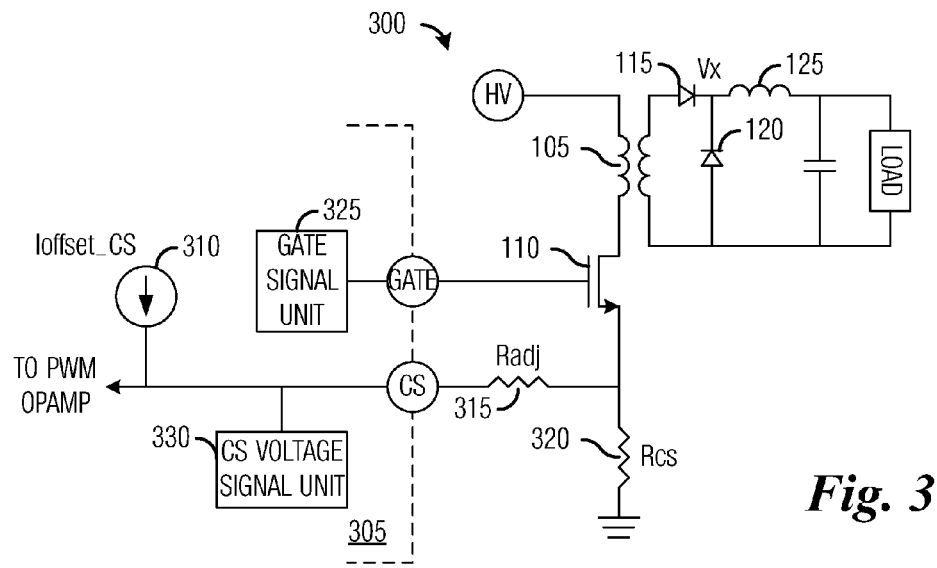
FIG. 3 is a diagram of a forward converter with attendant circuitry.

FIG. 3 is a diagram illustrating a forward converter 300 with attendant circuitry configured for PWM operation, wherein the forward converter 300 uses an offset voltage applied to a current sense (CS) voltage signal to help reduce audible noise produced in the forward converter 300. The forward converter 300, as shown in FIG. 3, may be coupled to an integrated circuit 305. The integrated circuit 305 may be used to provide control signals to control the operation of the forward converter 300, and so forth. Although shown to include the integrated circuit 305, the circuitry included in the integrated circuit 305 may be implemented using discrete electrical components, smaller integrated circuits, or combinations thereof.

The forward converter 300 includes a transformer 105 that may be used to convert an input AC voltage provided by voltage source HV into an isolated output voltage. The forward converter 300 also includes a transistor 110 operating as a switch, which when in an on state, the input AC voltage appears across the primary windings of the transformer 105. This, in turn, may produce a voltage Vx that may be expressed as $$Vx = \frac{N1}{N2} Vin$$

where N1 and N2 are the number of turns in the primary windings and the secondary windings of the transformer 105, respectively. A first diode 115 on the secondary windings of the transformer 105 may help to ensure that only positive voltages reach a load coupled to the forward converter 300. A second diode 120 may provide a discharge path for an inductor 125 when the transformer 105 has a zero or negative input voltage.

The forward converter 300 also includes a current source 310. The current source 310 may provide an offset current "Ioffset_CS" that may be provided to the forward converter 300 by way of a current sense (CS) pin of the integrated circuit 305. An adjustable resistor "Radj" 315 may be coupled to the CS pin and may be used to create an offset voltage from the offset current. The adjustable resistor 315 may be a form of a current-to-voltage converter. Other types of current-to-voltage converters may include a current controlled voltage source, and so forth, may be used in place of the adjustable resistor 315. The adjustable resistor 315 may also be used to adjust the amount of offset current and offset voltage. A resistor "Rcs" 320, coupled to the adjustable resistor Radj 315 and an output terminal of the transistor 110 may be used to measure current flowing through the transistor 110 as well as operating to help set the voltage offset introduced at the CS pin. The forward converter 300, as well as the adjustable resistor Radj 315 and the resistor Rcs 320 may be outside of the integrated circuit 305, which may enable a degree of control in the amount of offset voltage introduced at the CS pin.

The forward controller 300 also includes a GATE signal unit 325. The GATE signal unit 325 may be used to generate the GATE signal to control the switching of the transistor 110. For example, the GATE signal unit 325 may produce a high value on the GATE signal to turn on the transistor 110 and a low value on the GATE signal to turn off the transistor 110. Also included may be a CS voltage signal unit 330. The CS voltage signal unit 330 may be used to compare the value of the CS voltage signal with a threshold to determine when the transistor 110 may be turned off. The GATE signal unit 325 and the CS voltage signal unit 330 may be coupled to share information, such as when the CS voltage signal is about equal to the threshold, for example.

Although the discussion focuses on a forward converter, the embodiments may also be applicable to a flyback converter. Therefore, the discussion of the forward converter should not be construed as being limiting to either the spirit of the scope of the embodiments.

Figure 4A:
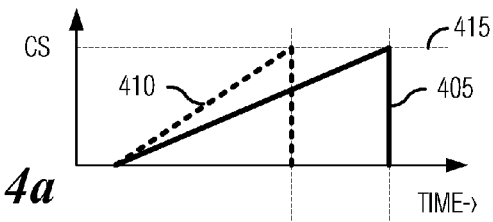
FIGS. 4a and 4b are diagrams of the effect of an offset voltage on a CS voltage signal and a GATE signal.
Figure 4B:
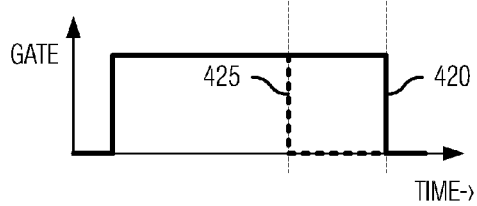

The introduction of the offset current and hence, the offset voltage, to the CS voltage signal, may result in a decrease in the duty cycle of the GATE signal. A reduction in the duty cycle of the GATE signal may also result in a reduction in the pulse jitter range. FIGS. 4a and 4b illustrate how the addition of the offset voltage to the CS voltage signal may decrease the duty cycle of the GATE signal. FIG. 4a illustrates a CS voltage signal prior to the introduction of the offset voltage, shown as trace 405, and a CS voltage signal after the introduction of the offset voltage, shown as trace 410. The introduction of the offset voltage to the CS voltage signal may help to alter the slew rate of the CS voltage signal. Changing the slew rate of the CS voltage signal may cause the CS voltage signal to reach a threshold 415 more rapidly. When the CS voltage signal reaches the threshold 415, the GATE signal may switch from a high value to a low value, for example.

Since the GATE signal may be dependent on a relationship between the CS voltage signal and the threshold 415, the CS voltage signal reaching the threshold 415 may cause the GATE signal to switch value (from high to low) earlier. FIG. 4b illustrates a GATE signal corresponding to the CS voltage signal prior to the introduction of the offset voltage, shown as trace 420, and a GATE signal corresponding to the CS voltage signal after the introduction of the offset voltage, shown as trace 425. The introduction of the offset voltage may have resulted in a reduction of the duty cycle of the GATE signal.

Figure 4C:
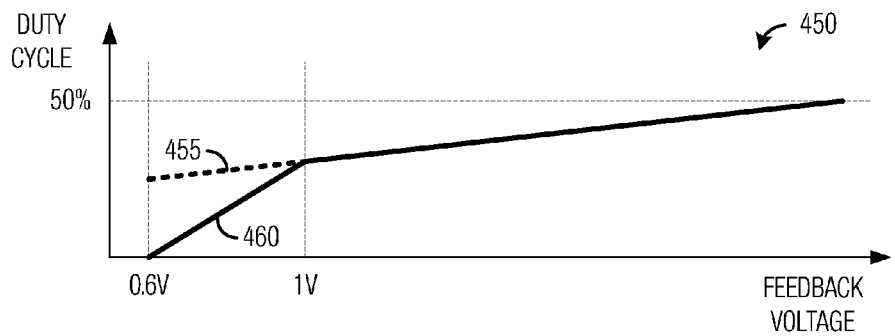
FIG. 4c is a diagram of a relationship between duty cycle and a feedback voltage signal.

FIG. 4c is a data plot 450 illustrating a relationship between duty cycle and feedback voltage signal. The offset current provided to the CS voltage signal may be dependent on the feedback voltage signal, with a larger offset current being provided to the CS voltage signal with smaller feedback voltage signals and a smaller offset current being provided to the CS voltage signal with larger feedback voltage signals. The data plot 450 illustrates two traces, a first trace 455 representing the relationship between duty cycle of the GATE signal and feedback voltage signal without the introduction of the offset current and a second trace 460 representing the relationship between the duty cycle and the feedback voltage signal with the introduction of the offset current. When the feedback voltage signal is greater than a value, for example, 1 V, there may be no injection of offset current (or an offset current having a value of about 0 A may be injected). For feedback voltage values of less than 1 V, an offset current with a non-zero value may be injected. The amount of offset current may change with different feedback voltage signal. For example, the amount of offset current provided to the CS voltage signal may increase with decreasing feedback voltage signal, as apparent in the decreasing duty cycle as the feedback voltage signal decreases. The change in the duty cycle of the GATE signal may be dependent on the application of the forward converter 300. The change in the duty cycle of the GATE signal shown in FIG. 4c is for illustrative and discussion purposes and should not be construed as being limiting to either the scope or the spirit of the embodiments.

Figure 5A:
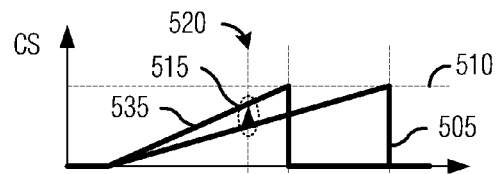
FIGS. 5a and 5b are diagrams of the effect of an offset voltage on audible noise.
Figure 5B:
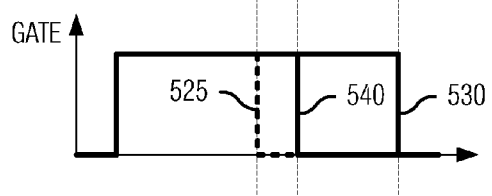

In addition to changing (reducing) the duty cycle of the GATE signal, the injection of the offset voltage to the CS voltage signal may also help to reduce unintended audible noise by altering the slew rate of the CS voltage signal. FIGS. 5a and 5b are data plots of the CS voltage signal and the GATE signal illustrating how the addition of the offset voltage to the CS voltage signal may decrease unintended audible noise. FIG. 5a is a data plot illustrating a CS voltage signal, shown as trace 505. The CS voltage signal ramps up to a threshold 510 in a substantially linear manner and then drops back down to about zero. Also shown is a noise spike 515 occurring at time event 520, about a mid-way point in the ramp up of the CS voltage signal. The noise spike 515 has sufficient magnitude so that it may be possible to incorrectly detect the noise spike 515 for the CS voltage signal reaching the threshold 510, thereby causing the GATE signal to reset to a low value, turning off the transistor 110 (shown as trace 525 in FIG. 5b).

The GATE signal may be in a high value until the CS voltage signal (trace 505) reaches the threshold 510 and then the GATE signal may switch to a low value (shown as trace 530). If the presence of the noise spike 515 may result in an incorrect detection of the noise spike 515 as the CS voltage signal reaching the threshold 510, then the GATE signal may switch to a low value earlier than intended, as shown in the trace 525.

Also shown in FIG. 5a is a CS voltage signal with an introduction of the offset voltage, shown as trace 535. The addition of the offset voltage may alter the slew rate of the CS voltage signal. With the offset voltage add, the CS voltage signal may reach the threshold 510 more rapidly. With the altered slew rate, the CS voltage signal may now be larger in magnitude than the noise spike 515 at the occurrence of the noise spike 515 (time event 520). Therefore, the occurrence of the noise spike 515 may not result in audible noise. FIG. 5b also shows a trace 540 illustrating the behavior of the GATE signal corresponding to the CS voltage signal with the offset voltage (the trace 535). Since the CS voltage signal reached the threshold 510 sooner, the GATE signal also switched from the high value to the low value sooner.

Figure 6A:
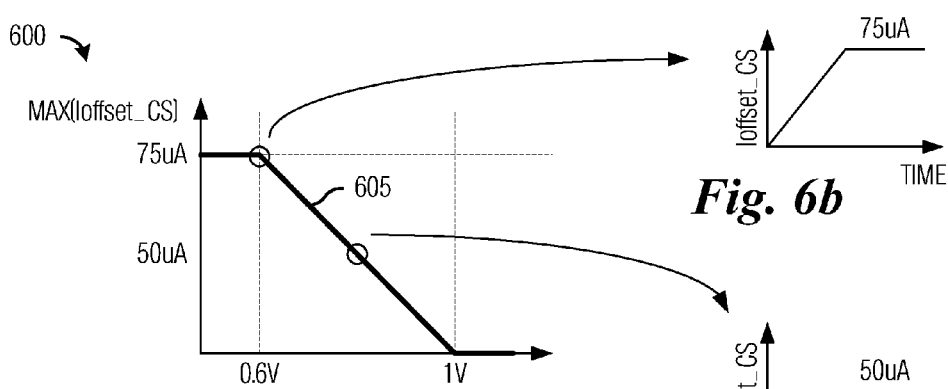
FIG. 6a is a diagram of a relationship between a maximum current and a feedback voltage signal.

The offset current, Ioffset_CS, (and hence the offset voltage) introduced to the CS voltage signal may not be a direct current (DC) current. Rather, to maintain current mode compatibility, the offset current may be designed to be a current ramp that may vary in magnitude depending on a value of a feedback voltage signal, which, in turn, may be based on an output of the forward converter 300. FIG. 6a is a data plot 600 illustrating a maximum value of the offset current Ioffset_CS (also referred to as Ioffset_FB) as a function of a feedback voltage signal, with the maximum value of the offset current shown as a trace 605. The maximum value of the offset current Ioffset_CS may be high at low values of the feedback voltage signal and may decrease for higher values of the feedback voltage signal. For example, at a feedback voltage signal of about 0.6 V, the maximum value of the offset current may be about 75 uA, while for a feedback voltage signal of about 1.0 V, the maximum value of the offset current may be about 0 uA. The relationship between the maximum offset current and the feedback voltage signal shown in FIG. 6a is for a specific application and is illustrated herein for discussion purposes. Different applications may result in different maximum offset current values for different feedback voltage signal values. Therefore, the relationship between the maximum offset current and the feedback voltage signal shown in FIG. 6a should not be construed as being limiting to either the scope or the spirit of the embodiments.

Figure 6B:
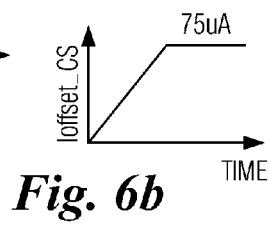
FIGS. 6b and 6c are diagrams of an offset current for different values of a feedback voltage signal.
Figure 6C:
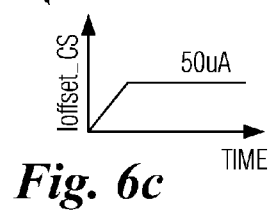

The offset current Ioffset_CS may ramp up to its maximum value in a substantially linear manner. FIG. 6b is a data plot of the offset current as a function of time when the feedback voltage signal is about 0.6 V. According to the data plot shown in FIG. 6a, when the feedback voltage signal is about 0.6 V, the maximum value of the offset current may be about 75 uA. The offset current Ioffset_CS may ramp up in a substantially linear fashion from about 0 A to the maximum value of about 75 uA, as shown in FIG. 6b. FIG. 6c is a data plot of the offset current as a function of time when the feedback voltage signal is about 0.8 V, which, according to the data plot shown in FIG. 6a, sets the maximum value of the offset current to be about 50 uA.

As shown in FIGS. 6b and 6c, when the offset current reaches its maximum value, the offset current maintains the maximum value. The offset current may maintain the maximum value until GATE signal switches value to the CS voltage signal reaching a threshold, for example. Although shown in FIGS. 6b and 6c to have a substantially linear ramp up from about 0 A to the maximum value, the offset current may have different ramp up behavior. For example, the ramp up may have a sublinear, superlinear, quadratic, exponential, logarithmic, and so forth, behavior. The ramp up behavior may be adjusted to meet requirements of intended applications. Therefore, the illustration and discussion of a substantially linear ramp up behavior should not be construed as being limiting to either the scope or the spirit of the embodiments.

Figure 7:
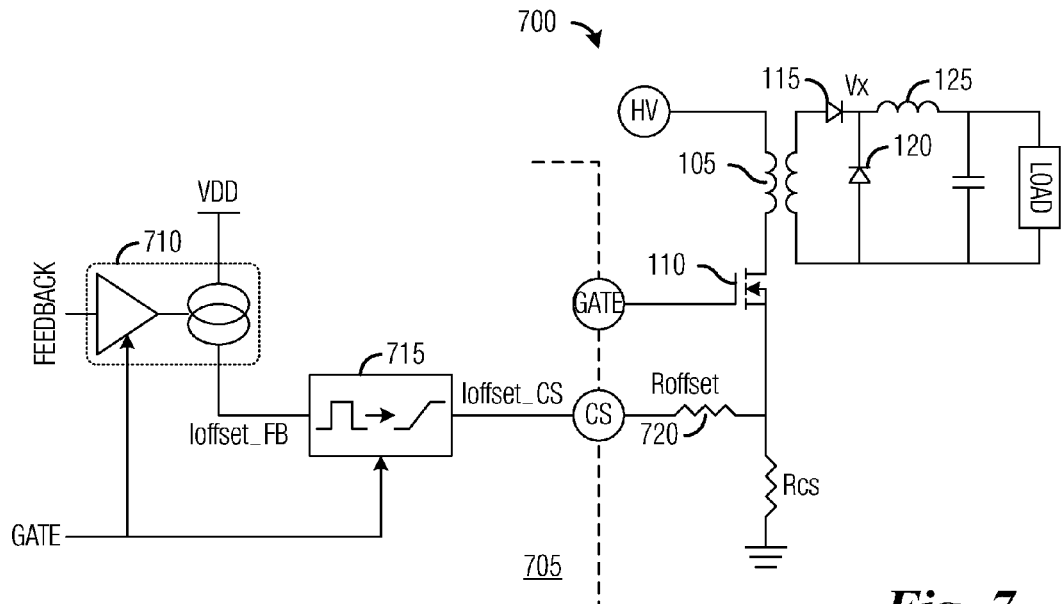
FIG. 7 is a diagram of a forward converter with attendant circuitry.

FIG. 7 is a diagram of a forward converter 700 with attendant circuitry configured for PWM operation, wherein the forward converter 700 uses a ramping offset voltage applied to a CS voltage signal to help reduce audible noise. The forward converter 700, as shown in FIG. 7, may be coupled to an integrated circuit 705. The integrated circuit 705 may be used to provide control signals to control the operation of the forward converter 700, generating the offset current (hence, the offset voltage), and so forth.

A feedback voltage signal, such as a signal based on an output of the forward converter 700, may be used to control an operational transconductance amplifier (OTA) 710. The OTA 710 may produce an output current "Ioffset_FB" based on the feedback voltage signal. The output current Ioffset_FB may be a maximum value of the offset current Ioffset_CS. Other types of voltage controlled current sources (VCCS) or a voltage to current converter may be used in place of the OTA 710. The OTA 710 may be coupled to a ramp unit 715. The ramp unit 715 may produce a current that ramps up from substantially zero to about the magnitude of a current provided at its input. For example, if the output of the OTA 710 (Ioffset_FB) is provided to the ramp unit 715, then the ramp unit 715 may produce a current that ramps up from substantially zero to about Ioffset_FB. Once output of the ramp unit 715 reaches the magnitude of the current provided at its input, the ramp unit 715 may continue to produce a current substantially equal to the current provided at its input. The nature of the ramp up (for example, linear, sublinear, superlinear, quadratic, exponential, logarithmic, and so forth) may be specified depending on performance requirements and specifications. The output of the ramp unit 715 may be provided to the forward converter 700 where it may be converted into an offset voltage by an adjustable resistor "Roffset" 720. The integrated circuit 705 may include units similar to the gate signal unit 325 and the CS voltage signal unit 330 shown in FIG. 3. However, these units are omitted in FIG. 7 to simplify the diagram.

Figures 8, 17:
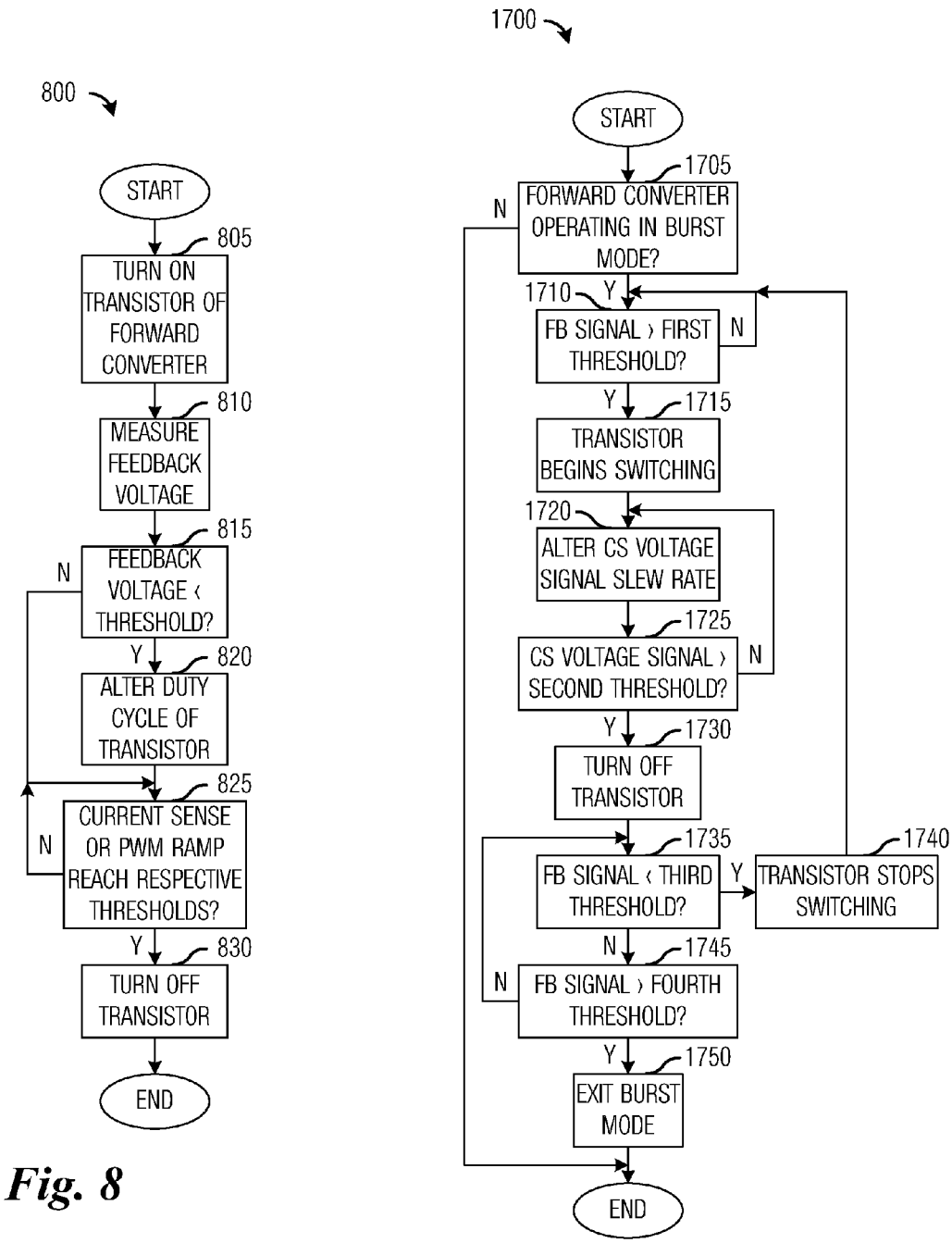
FIG. 8 is a diagram of a sequence of events in the operation of a forward converter.
FIG. 17 is a diagram of a sequence of events in the operation of a forward converter.

FIG. 8 is a diagram illustrating a sequence of events 800 in the operation of a forward converter, wherein the forward converter includes audio noise mitigating circuitry. The sequence of events 800 may be descriptive of operating a forward converter, such as the forward converter 700, operating in a standard operating mode. The operation of a forward converter may begin with a turning on of a transistor, such as the transistor 110, by switching the value on a GATE signal from a low value to a high value (block 805). The GATE signal may be used to control the state of the transistor 110 and depending on the type of transistor used as the transistor 110, the switching of the GATE signal from a low value to a high value may turn on the transistor 110.

After turning on the transistor 110, a feedback voltage signal may be measured (block 810) and compared with a threshold (block 815). If the feedback voltage signal is smaller than the threshold, then the forward converter 700 may be susceptible to audible noise that may be the result of jittering in the GATE signal, internal and external high frequency switching, and so forth. If the feedback voltage is smaller than the threshold, then the forward converter 700 may be made less prone to generating audible noise by altering the transistor's duty cycle (block 820). Preferably, the forward converter 700 may be made less prone to generating audible noise by reducing the transistor's duty cycle.

As discussed previously, the transistor's duty cycle may be decreased by injecting an offset voltage onto a CS voltage signal that may be used to control the state of the transistor 110. The presence of the offset voltage on the CS voltage signal may reduce the time that the transistor 110 is turned on, thereby reducing the chance that audible noise is generated. Furthermore, by injecting the offset voltage onto the CS voltage signal, the slew rate of the CS voltage signal may be increased. This may result in a masking of noise on the CS voltage signal, thereby reducing audible noise.

The amount of offset voltage injected may depend on the magnitude of the feedback voltage signal, with a larger amount of offset voltage being injected for smaller feedback voltage signal magnitude. The amount of offset voltage as a function of feedback voltage signal may be dependent on the application of the forward converter 700.

Additionally, the offset voltage may not be a DC voltage. Rather, the offset voltage may ramp up from about zero to about a maximum voltage that may be dependent on the value of the feedback voltage signal. The behavior of the ramp up from about zero to about the maximum voltage may also be dependent on the application of the forward converter 700. Examples of the behavior of the ramp up may include linear, sublinear, superlinear, quadratic, exponential, logarithmic, and so forth.

As the offset voltage is being injected, a check may be performed to determine if the CS voltage signal or a PWM ramp (PWMRMP) signal has reached respective thresholds (block 825). Different thresholds may be used in the check of the CS voltage signal and the PWMRMP signal. For example, the PWMRMP signal may be compared with the feedback (FB) signal. The CS voltage signal may be compared with a threshold that is related to the feedback (FB) signal. Once either the CS voltage signal or the PWMRMP signal has reached their respective thresholds, then the transistor 110 may be turned off (block 830). The operation of the forward converter 700 may continue by repeating the sequence of events 800 or the operation of the forward converter 700 may terminate after turning off the transistor 110.

Figure 9:
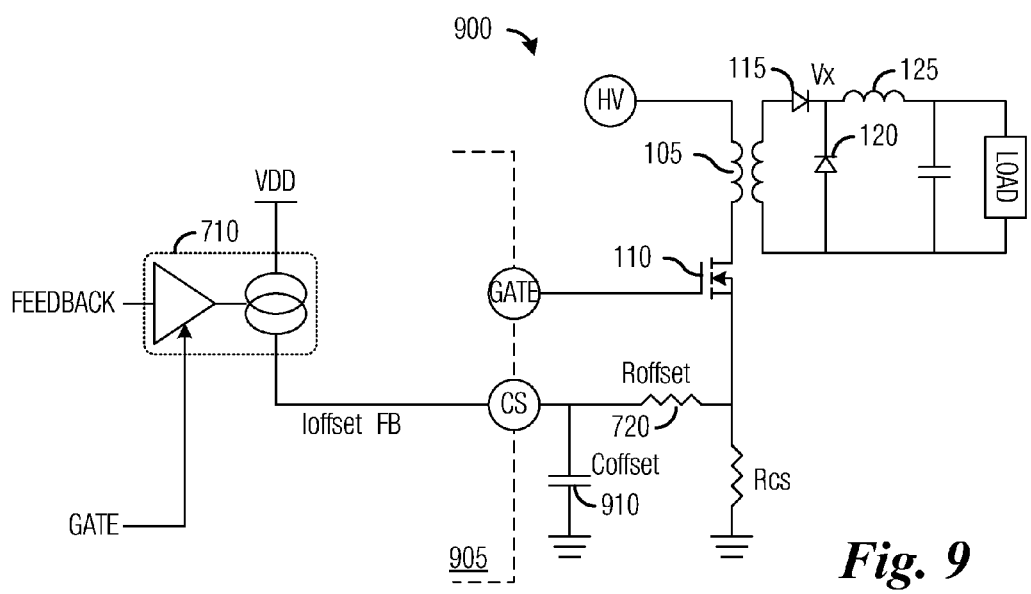
FIG. 9 is a diagram of a forward converter with attendant circuitry.

FIG. 9 is a diagram of a forward converter 900 with attendant circuitry configured for PWM operation, wherein the forward converter 900 uses a ramping offset voltage applied to a CS voltage signal to help reduce audible noise. The forward converter 900, as shown in FIG. 9, may be coupled to an integrated circuit 905. The integrated circuit 905 may be used to provide control signals to control the operation of the forward converter 900, generating the offset current (hence, the offset voltage), and so forth.

Like the integrated circuit 705, the integrated circuit 905 includes the OTA 710, which may be used to convert a voltage (such as from the feedback voltage signal) into an output current (for example, Ioffset_FB). The output current created by the OTA 710 may then be provided to the forward converter 900, where a capacitor "Coffset" 910 may create a current ramp for the offset current. The capacitor 910 may operate in a manner similar to the ramp unit 715. The use of the capacitor 910 may make it possible to alter the ramp up behavior of the offset current. For example, different capacitor values may be used to change the ramp up behavior of the offset current. This may be achieved using a capacitor with a selectable value (capacitance). The capacitance may be selected based on a desired ramp up behavior. The integrated circuit 905 may include units similar to the gate signal unit 325 and the CS voltage signal unit 330 shown in FIG. 3. However, these units are omitted in FIG. 9 to simplify the diagram.

During low load or no load conditions, an integrated circuit controlling the operation of a forward converter may enter a burst mode operation. The burst mode may help to minimize input power. In general, there may be several conditions that may need to be met in order for an integrated circuit, such as the integrated circuit 305, controlling the operation of a forward converter, such as the forward converter 300, to enter the burst mode. For example, the integrated circuit 305 may enter the burst mode when a required output power of the forward converter 300 is low. When the output power is low, a delivered power to the load will result in the output voltage being higher than intended (designed). This may be reflected to the integrated circuit 300 through a feedback signal. When output voltage is too high, the feedback voltage is low. When the output voltage is too low, the feedback voltage is high. Therefore, to enter the burst mode, the feedback voltage may be monitored. If the feedback voltage is lower than a certain value, for example 1.2 V, the integrated circuit 300 may enter the burst mode.

When the integrated circuit 305 enters the burst mode, the integrated circuit 305 may no longer switch the transistor 110 and current consumption may be reduced to produce a corresponding decrease in power consumption. Since the transistor 110 may no longer be switching, the output voltage of the forward converter 300 may begin to fall. The fall in the output voltage of the forward converter 300 may produce a corresponding rise in the feedback voltage. When the feedback voltage exceeds a threshold, for example, 3.6 V, the transistor 110 may begin to switch on. The transistor 110 may be turned off again when the CS voltage signal reaches a threshold, for example 0.25 V. If the output power remains low, the feedback voltage may start to decrease when the transistor 110 starts switching. When the feedback voltage falls to a threshold, for example, 3.0 V, the transistor 110 may stop switching. This cycle may repeat until the output power exceeds a condition for exiting the burst mode operation.

The integrated circuit 305 may exit the burst mode when a load connected to the forward converter 300 demands more power than what may be delivered during burst mode. A condition, commonly referred to as an exit burst mode level, typically utilized to exit the burst mode operation may involve the load jumping from light or no load to normal load. The exit burst mode level may be detected by comparing the feedback voltage signal with a threshold, for example, 4.0 V. The threshold may be dependent on parameters, such as the CS voltage signal limit threshold, transformer inductance, switching frequency of the transistor 110, and so forth. If the integrated circuit 305 is in the burst mode operation and is switching and the feedback voltage signal exceeds the threshold, then the integrated circuit 305 may exit the burst mode and enter a normal mode of operation.

Figure 10:
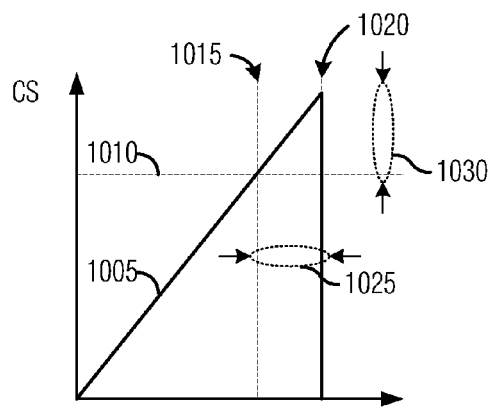
FIG. 10 is a diagram of a CS voltage signal illustrating conditions for exiting a burst mode of operation.

FIG. 10 is a diagram illustrating the CS voltage signal, shown as trace 1005. As discussed previously, when the transistor 110 is turned on, the CS voltage signal increases. When the CS voltage signal reaches and exceeds a threshold 1010 at time event 1015, the transistor 110 may switch off. In doing so, a maximum output power that may be delivered to the output of the forward converter 300 may be limited. Due to the limit on the maximum output power, the feedback voltage may continue to increase. Once the feedback voltage exceeds a threshold, for example, 4.0 V, the integrated circuit 305 may exit the burst mode operation.

The behavior of the CS voltage signal may be dependent on factors such as a propagation delay present in the integrated circuit 305 and the forward converter 300, an inductance of the transformer 105, and an input voltage. A maximum power to exit the burst mode operation may be expressed mathematically as:

$$P = 0.5 * L * \left(\frac{V}{R}\right)^2 * f,$$

where V is a peak current sense (CS) limitation voltage during the burst mode operation, L is the inductance of the transformer 105, R is the CS resistor 320, and f is the switching frequency of the gate (the transistor 110). Therefore, the maximum power to exit the burst mode may be dependant on a maximum value of the CS voltage signal and the inductance of the transformer 105.

Once the CS voltage signal 1005 reaches the threshold 1010, the integrated circuit 305 may turn off the gate (the transistor 110) substantially instantly. However, due to propagation delay present between the time the CS voltage signal exceeds threshold and the time that transistor 110 is switched off in the integrated circuit 305 and the forward converter 300, the CS voltage signal may continue to rise to a level higher than the threshold 1010. The CS voltage signal may continue to rise until time event 1020, when the transistor 110 is switched off after the propagation delay, and it may drop to about zero. The propagation delay of the integrated circuit 305 and the forward converter 300 is shown in FIG. 10 as interval 1025, while an amount of overshoot in the CS voltage signal is shown as interval 1030. This (the overshoot in the CS voltage signal) may result in an exit burst mode power level that may be higher than intended. This may lead to a larger than desired or allowable dip in an output voltage of the forward converter 300.

Figure 11:
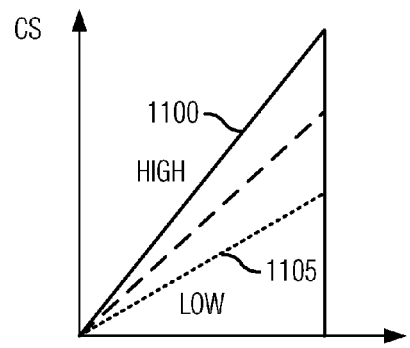
FIG. 11 is a diagram of the effect of input voltage on a slew rate of a CS voltage signal.

FIG. 11 is a diagram illustrating the effect of input voltages on a slew rate of the CS voltage signal. If the input voltage is high, then the slew rate of the CS voltage signal may also be high (shown as trace 1100). Similarly, if the input voltage is low, then the slew rate of the CS voltage signal may be low (shown as trace 1105). The different slew rates of the CS voltage signal may change the overshoot in the CS voltage signal, which may result in the exit burst mode power level having different values.

Figure 12:
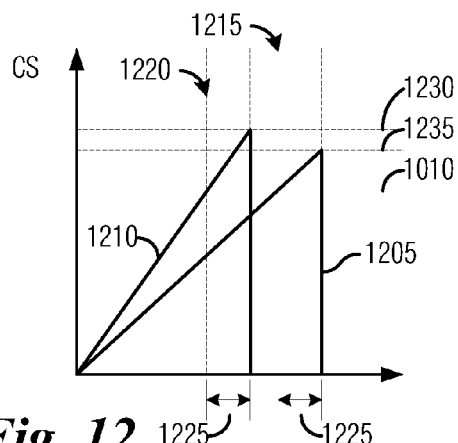
FIG. 12 is a diagram of the effect of the slew rate of the CS voltage signal on the overshoot of the CS voltage signal.

FIG. 12 is a diagram illustrating the effect of the slew rate of the CS voltage signal on the overshoot of the CS voltage signal. FIG. 12 illustrates a first CS voltage signal (shown as trace 1205) and a second CS voltage signal (shown as trace 1210). The first CS voltage signal 1205 may have a first slew rate and the second CS voltage signal 1210 may have a second slew rate, with the respective slew rates being dependent on a level of an input voltage.

The first CS voltage signal 1205 may reach the threshold 1010 at a first time event 1215 and the second CS voltage signal 1210 may reach the threshold 1010 at a second time event 1220. Since the second slew rate may be greater than the first slew rate, the second time event 1220 may occur prior to the first time event 1215 in time. However, since the propagation delay of the integrated circuit 305 and the forward converter 300 may remain substantially constant regardless of input voltage, the first CS voltage signal 1205 and the second CS voltage signal 1210 may continue to increase for substantially the same amount of time (shown in FIG. 12 as spans 1225. With its greater slew rate, the second CS voltage signal 1210 may reach a higher level (shown as level 1230) than the first CS voltage signal 1205 (shown as level 1235), leading to a higher exit burst mode power level.

Figure 13:
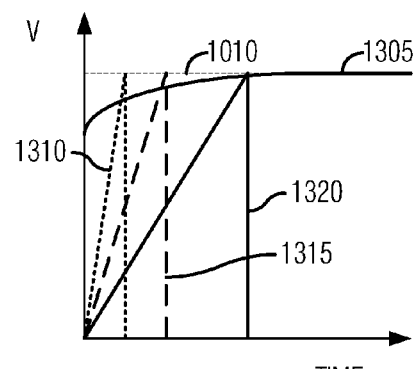
FIG. 13 is a diagram of a prior art technique for compensating for a propagation delay.

FIG. 13 is a diagram illustrating a prior art technique for compensating for the propagation delay. The prior art technique involves the use of a threshold 1305 that varies with time. For example, the threshold 1305 may be expressed mathematically as:

$$\text{Threshold}(t) = 0.25 * \left(1 - 0.05 e^{\frac{t}{time\_constant}}\right),$$

where t is time, and time_constant is a constant providing a desired compensating behavior for the threshold 1305. So, rather than a constant (DC) threshold, such as the threshold 1010, the CS voltage signal may be compared with the threshold 1305, which may vary as a function of time. Therefore, with high input voltages (shown as trace 1310), the threshold 1305 may be smaller than the threshold 1010 by a significant amount, while with an intermediate input voltage (shown as trace 1315), the threshold 1305 may be smaller than the threshold 1010, but by a smaller amount than the threshold 1305 for the high input voltage. For a low input voltage (shown as trace 1320), the threshold 1305 may be about equal to the threshold 1010.

Figure 14:
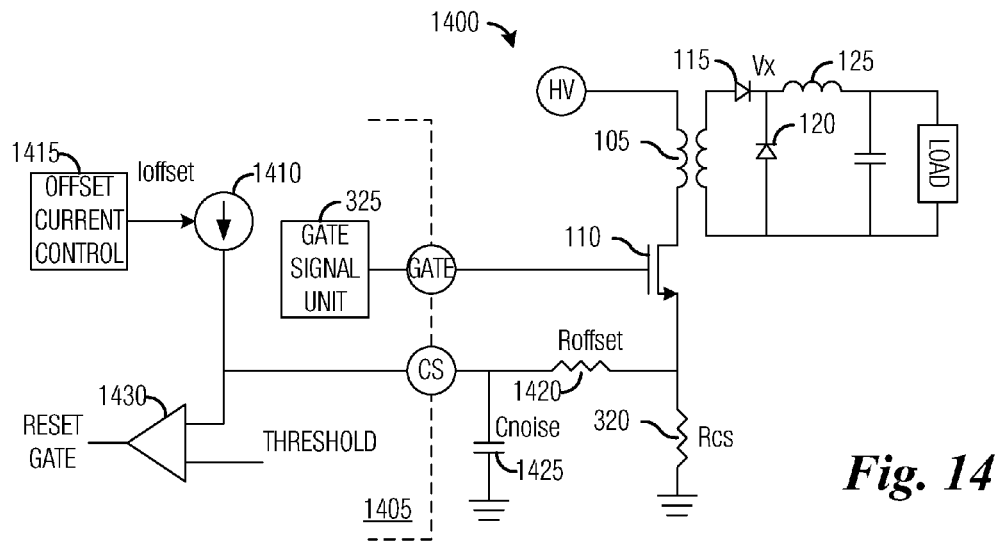
FIG. 14 is a diagram of a forward converter with attendant circuitry.

FIG. 14 is a diagram of a forward converter 1400 with attendant circuitry configured for PWM operation, wherein the forward converter 1400 uses a ramping offset voltage applied to a CS voltage signal to help control an exit burst mode power level. The forward converter 1400, as shown in FIG. 14, may be coupled to an integrated circuit 1405. The integrated circuit 1405 may be used to provide control signals to control the operation of the forward converter 1400, generating an offset current (hence, the offset voltage) to be provided to the CS voltage signal, and so forth.

The integrated circuit 1405 includes a current source 1410 that may be used to provide an offset current (hence, the offset voltage) to the CS voltage signal. The current source 1410 may be controlled by an offset current control unit 1415. The state of the current source 1410 may be dependent on the operating mode of the forward converter 1400 as well as the state of the transistor 110. The offset current control unit 1415 may turn the current source 1410 on when the integrated circuit 1405 is operating the forward converter 1400 in a burst mode (e.g., burst mode=on) and when the transistor 110 of the forward converter 1400 is on (e.g., when a GATE signal provided by the gate signal unit 325 is active (on)). The offset current control unit 1415 may turn the current source 1410 off when the integrated circuit is not operating the forward converter 1400 in a burst mode, regardless of the state of the transistor 110. A table, shown below, provides a summary of the state of the current source 1410 as a function of the burst mode and the transistor 110.

| Burst Mode | Transistor | Current Source |
|---|---|---|
| ON (1) | ON | ON |
| ON | OFF (0) | OFF |
| OFF | ON | OFF |
| OFF | OFF | OFF |

The offset current provided by the current source 1410 may be changed into an offset voltage by an adjustable resistor 1420. The adjustable resistor 1420 may not only be used to change the offset current into an offset voltage, but the adjustable resistor 1420 may be adjusted to alter a magnitude of the offset voltage. A capacitor 1425 may be used to help provide filtering for noise that may be present on the CS voltage signal.

A comparator 1430 may be used to compare the CS voltage signal with a threshold, for example, 0.25 V, which may be a condition for exiting the burst mode. The comparator 1430 may be a form of the CS voltage signal unit 330. When the CS voltage signal meets or exceeds the threshold, the comparator 1430 may cause the transistor 110 (the GATE of the forward converter 1400) to reset (turn off).

Figure 15:
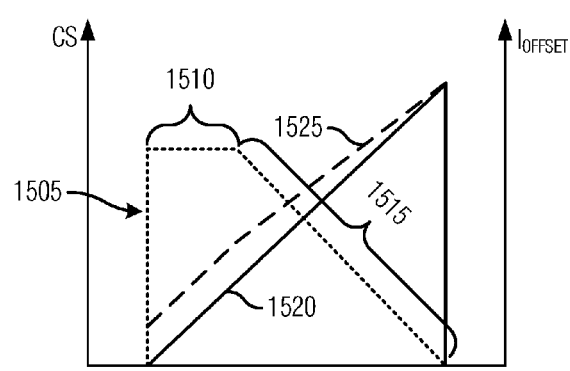
FIG. 15 is a diagram of an offset current provided by a current source and the effect of the offset current on the CS voltage signal.

The offset current provided by the current source 1410 may not be a constant (DC) current. Rather, the offset current may vary with time. FIG. 15 is a diagram illustrating the offset current (shown as trace 1505) provided by the current source 1410. The offset current 1505 may include two phases. A first phase 1510 of the offset current 1505 may be a flat (constant) offset current with a duration that may be dependent on a leading edge blanking time. The leading edge blanking time may be used to help prevent the transistor 110 from accidentally turning off as a result of signal glitches that may occur when the transistor 110 is turned on.

A second phase 1515 may be a decaying offset current that starts of at the level of the first phase 1510 and may drop down to substantially zero. As shown in FIG. 15, the second phase 1515 of the offset current 1505 may decay at a substantially linear rate. However, depending on the application, the decay of the offset current 1505 in the second phase 1515 may be sublinear, superlinear, exponential, logarithmic, quadratic, and so forth. Therefore, the discussion of a linear decay should not be construed as being limiting to either the scope or the spirit of the embodiments.

Also shown in FIG. 15 is a CS voltage signal (shown as trace 1520) without the addition of an offset voltage arising from the offset current and a CS voltage signal with the addition of the offset voltage arising from the offset current (shown as trace 1525). The addition of the offset current alters the slew rate of the CS voltage signal, with a maximum effect while the offset current 1505 is in the first phase 1510 and with decreased effect as the offset current 1505 decays in magnitude during the second phase 1515.

If the offset voltage drops down to substantially zero before the CS voltage signal reaches a threshold, for example, 0.25 V, then the CS voltage signal may continue to rise without the assistance of the offset voltage until it reaches the threshold. In other words, the CS voltage signal may revert back to its original slew rate.

In general, the CS voltage signal with the addition of the offset voltage may be expressed mathematically as:

$$VCS = Voffset + RCS\,IDS,PWR\,TRX,$$

where VCS is the CS voltage signal, Voffset is the offset voltage, RCS is the resistor 320, and IDS,PWR TRX is the drain-source current of the transistor 110. Therefore, when the slew rate is higher, Voffset is higher, and therefore, R1IDS,PWR TRX is lower. When the slew rate is lower, Voffset is lower, and therefore, R1IDS,PWR TRX is higher. As a result, with the same CS voltage signal threshold, the transistor 110 may be turned off earlier for a higher slew rate. Since the propagation delay is the same for either slew rate, turning the transistor 110 off earlier for the higher slew rate may reduce the overshoot in the CS voltage signal and vice versa. It may be possible to achieve a constant or relatively constant exiting burst mode level by adjusting the resistor 1420.

Figure 16:
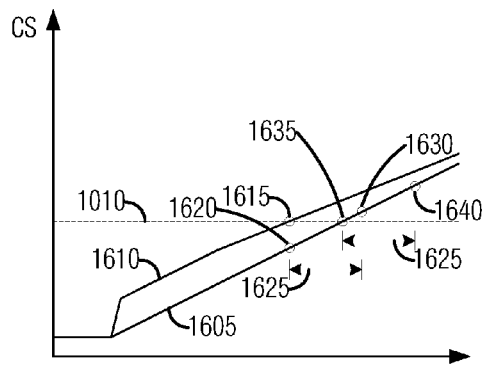
FIG. 16 is a diagram of the effect of an offset voltage on the CS voltage signal.

FIG. 16 is a diagram illustrating the effect of offset voltage on the CS voltage signal. FIG. 16 illustrates the CS voltage signal without the addition of the offset voltage (shown as trace 1605) and the CS voltage signal with the addition of the offset voltage (shown as trace 1610). When the CS voltage signal with the addition of the offset voltage 1610 exceeds the threshold 1010 (shown as point 1615), the actual value of the CS voltage signal alone may be lower than the threshold 1010 (shown as point 1620). For example, if the threshold 1010 is set at 0.20 V, the point 1615 may correspond to the CS voltage signal with the addition of the offset voltage 1610 being equal to about 0.20086 V and the point 1620 may correspond to the CS voltage signal without the addition of the offset voltage 1605 being significantly below 0.20 V. Let an interval 1625 represent the propagation delay. As the CS voltage signal with the addition of the offset voltage 1610 and the CS voltage signal without the addition of the offset voltage 1605 continue to rise while a signal to turn off the transistor 110 propagates, the CS voltage signal with the addition of the offset voltage 1610 may reach a value of about 0.22134 V by the time the transistor 110 turns off (shown as point 1630) and the CS voltage signal without the addition of the offset voltage 1605 may reach a value of about 0.26073 V by the time the transistor 110 turns off (shown as point 1640).

However, if the offset voltage was not used, then the CS voltage signal without the addition of the offset voltage 1605 may exceed the threshold 1010 at point 1635 at a value of about 0.20042. Then, due to the propagation delay, the CS voltage signal without the addition of the offset voltage 1605 may continue to rise to a value of about 0.26073 V by the time the transistor 110 turns off. The use of the offset voltage may reduce a deviation caused by the propagation delay from about 60 mV (0.26073 V−0.20042 V) down to about 20 mV (0.22134 V−0.20086 V).

FIG. 17 is a diagram illustrating a sequence of events 1700 in the operation of a forward converter, wherein the forward converter includes circuitry to controlling the output voltage of the forward converter. The sequence of events 1700 may be descriptive of operating a forward converter, such as the forward converter 1400, operating in a burst mode. The operation of the forward converter 1400 may begin with a check to determine if the forward converter 1400 is operating in the burst mode (block 1705). If the forward converter 1400 is not operating in the burst mode, then the sequence of events 1700 may terminate.

If the forward converter 1400 is operating in the burst mode, then a second check may be performed to determine if a feedback signal related to an output of the forward converter 1400 has exceeded a first threshold (block 1710). While the forward converter 1400 is operating in the burst mode and the transistor 110 is not switching, the output voltage of the forward converter 1400 may begin to fall and the feedback signal may begin to rise. The first threshold may be a value determined by the application of the forward converter 1400 and may be equal to about 3.6 V, for example. If the feedback signal has exceeded the first threshold, then the transistor 110 may begin switching (block 1715). However, if the feedback signal has not exceeded the first threshold, then the second check may be repeated. A delay may optionally be inserted between consecutive second checks to allow time for the feedback signal to rise.

With the transistor 110 beginning to switch, the CS voltage signal of the forward converter 1400 may be used to determine when to turn the transistor 110 off. When and if the CS voltage signal exceeds a second threshold, for example, 0.25 V, then the transistor 110 may be turned off. However, simply checking the CS voltage signal against the threshold may not yield desired results. For example, due to propagation delays in the forward converter 1400 and in an integrated circuit used to control the operation of the forward converter 1400, the CS voltage signal may continue to rise after it has been determined that the CS voltage signal has risen to the level of the threshold. The overshooting of the threshold by the CS voltage signal may result in a dip in the output voltage of the forward converter 1400, with the degree of the overshoot potentially being dependent on a magnitude of an input voltage signal.

Therefore, compensation based on the magnitude of the input voltage signal may be applied. Compensation may be applied by altering the slew rate of the CS voltage signal (block 1720). The compensation may be achieved with the addition of an offset voltage. Preferably, the offset voltage may be time dependent, with two phases: a first phase wherein the offset voltage may be constant or relatively constant to correspond to a leading edge blanking time and a second phase wherein the offset voltage may decay to substantially zero. The nature of the decay of the offset voltage may be linear, sublinear, superlinear, exponential, logarithmic, quadratic, and so forth.

As the slew rate of the CS voltage signal is being altered, a third check may be used to determine if the CS voltage signal has exceeded the second threshold (block 1725). If the CS voltage signal has not exceeded the second threshold, then the altering of the CS voltage signal may continue (block 1720). If the CS voltage signal has exceeded the second threshold, then the transistor 110 may be turned off (block 1730).

When the transistor 110 is turned off and the output power of the forward converter 1400 remains low, then the feedback signal may begin to fall. A fourth check may be used to determine if the feedback signal has fallen below a third threshold, for example, 3.0 V (block 1735). If the feedback signal has fallen below the third threshold, then the transistor 110 may stop switching (block 1740) and the operation of the forward converter 1400 may return to block 1710 to wait for the feedback signal to rise above the first threshold.

If the feedback signal remains larger than the third threshold (block 1735), then a fifth check may be performed to determine if the feedback signal is greater than a fourth threshold, for example 4.0 V (block 1745). When the CS voltage signal exceeds the second threshold and the transistor 110 is turned off, if the output power of the forward converter 1400 is at or about a maximum output power level, then the feedback signal may continue to rise rather than fall. This may be an indicator that a desired output power may be greater than the forward converter 1400 is capable of providing while operating in the burst mode. Therefore, if the feedback signal exceeds the fourth threshold, the forward converter 1400 exits the burst mode (block 1750). If the feedback signal does not exceed the fourth threshold, then the operation of the forward converter 1400 may return to block 1735 to determine if the feedback signal has fallen below the third threshold.

Figure 18:
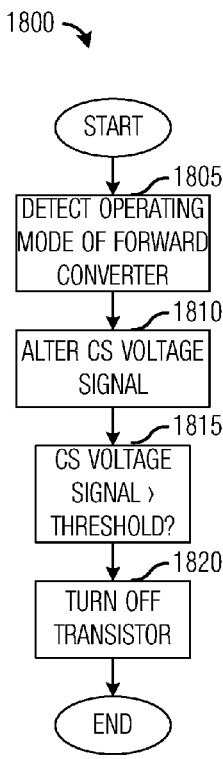
FIG. 18 is a diagram of a sequence of events in the operation of a forward converter.

FIG. 18 illustrates a sequence of event 1800 for operating a forward converter. The sequence of events 1800 may be descriptive of operating a forward converter, such as the forward converter 300, 700, 900, or 1400, operating in a standard operating mode or a burst operating mode. The operating of the forward converter may begin with a determining of an operating mode of the forward converter (block 1805). As discussed previously, the forward converter may be operating in either the normal or the burst operating mode. After determining the operating mode of the forward converter, the CS voltage signal of the forward converter may be altered, with the nature of the altering being dependent on the operating mode of the forward converter (block 1810).

For example, if the forward converter is operating in the standard operating mode, then the CS voltage signal may be altered by adding a voltage offset that increases with time, starting at substantially zero until it reaches a level that may be dependent on a level of a feedback signal. Once the voltage offset reaches the level, the voltage offset may remain at or about the level. Alternatively, if the forward converter is operating in the burst operating mode, then the CS voltage signal may be altered by adding a voltage offset that starts at a level for a period of time that may correspond to a leading edge blanking time and then decays to substantially zero.

As the voltage offset is being added to the CS voltage signal, the value of the CS voltage signal may be compared with a threshold (block 1815) and if the CS voltage signal is greater than or equal to the threshold, then the transistor 110 of the forward converter may be turned off (block 1820). The altering of the CS voltage signal by adding the offset voltage may change an amount of time that is required for the CS voltage signal to reach or exceed the threshold, which may help to make the forward converter more immune to audible noise or less likely to allow an output voltage to dip below an acceptable level.

Although the embodiments have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A control circuit for a converter, the converter having a switch, the control circuit comprising:
   a voltage controlled current source (VCCS) having an output coupled to a current sense node, wherein
   the current sense node is configured to be coupled to a first terminal of the switch, and
   the VCCS is configured to provide a current based on an output of the converter in response to a determining that the converter is operating in a normal mode or a current based on an input of the converter in response to a determining that the converter is operating in a burst mode and a switch of the converter is in an on state, wherein the VCCS is further configured to alter a slew rate of a signal on the current sense node when a duty cycle of the converter is less than a first threshold;

a current sense signal unit coupled to the current sense node, the current sense signal unit configured to compare a voltage potential at the current sense node with a second threshold; and a gate signal unit configured to be coupled to a control terminal of the switch and to the current sense signal unit, the gate signal unit configured to generate a control signal for the switch based on a result of an output of the current sense signal unit.

2. The control circuit of claim 1, further comprising a current-to-voltage converter coupled between the current sense node and the first terminal of the switch, the current-to-voltage converter configured to convert the current provided by the VCCS into a voltage.

3. The control circuit of claim 2, wherein the current-to-voltage converter is a resistor.

4. The control circuit of claim 3, wherein the resistor is an adjustable resistor.

5. The control circuit of claim 1, further comprising a ramp unit coupled between the VCCS and the current sense node, the ramp unit configured to generate a ramping current starting at about a first value to about the current produced by the VCCS.

6. The control circuit of claim 1, further comprising a ramp unit coupled between the VCCS and the current sense node, the ramp unit configured to generate a ramping current starting at the current produced by the VCCS to a second value.

7. The control circuit of claim 1, further comprising a capacitor coupled to the current sense node, the capacitor providing a ramping voltage from the current produced by the VCCS.

8. The control circuit of claim 1, wherein the VCCS is further configured to alter a slew rate of a signal on the current sense node when the converter is operating in a burst mode.

9. The control circuit of claim 1, wherein the control circuit is disposed on an integrated circuit.

10. The control circuit of claim 1, wherein the VCCS comprises an operational transconductance amplifier (OTA).

11. A circuit comprising:
a gate driving circuit configured to drive a switch of a power converter;
a comparator comprising a first input coupled to a current sense node and an output coupled to the gate driving circuit, wherein the current sense node is configured to be coupled to a first terminal of the switch; and
a current generator having an output coupled to the current sense node, wherein
the current generator is configured to alter a slew rate of a signal at the current sense node,
the current generator is configured to alter the slew rate when a power converter is in a burst mode, and
the current generator alters the slew rate by generating a first constant current level for a first time period, and then generating a current that decreases from the first constant current level to a second current level during a second time period.

12. The circuit of claim 11, wherein the second current level is about zero.

13. The circuit of claim 11, wherein the first time period begins when the gate driving circuit activates the switch of the power converter.

14. A circuit comprising:
a gate driving circuit configured to drive a switch of a power converter;
a comparator comprising a first input coupled to a current sense node and an output coupled to the gate driving circuit, wherein the current sense node is configured to be coupled to a first terminal of the switch; and
a current generator having an output coupled to the current sense node, wherein
the current generator is configured to alter a slew rate of a signal at the current sense node, and
the current generator is configured to alter the slew rate when a duty cycle of the power converter is less than a first threshold.

15. The circuit of claim 14, wherein the current generator alters the slew rate by generating a current that starts from a first current level and increases over time to a second current level during a first time period, and then remains at the second current level during a second time period.

16. The circuit of claim 15, wherein the second current level is dependent on a feedback voltage of the power converter.

17. The circuit of claim 14, wherein the current generator comprises a voltage controlled current source (VCCS).

18. An integrated circuit comprising:
a gate driving circuit coupled to a gate control output pin of the integrated circuit;
a comparator comprising a first input coupled to a current sense node coupled to a current sense node pin of the integrated circuit and an output coupled to the gate driving circuit; and
a current generator having an output coupled to the current sense node, wherein the current generator is configured to alter a slew rate of a signal at the current sense node when a duty cycle of a signal at the gate control output pin is less than a first threshold.

19. The integrated circuit of claim 18, wherein the current generator alters the slew rate by generating a current that starts from a first current level and increases over time to a second current level during a first time period, and then remains at the second current level during a second time period.

20. The integrated circuit of claim 19, wherein the second current level is dependent on a feedback voltage of a power converter.

21. The integrated circuit of claim 18, wherein the current generator comprises a voltage controlled current source (VCCS).

22. The integrated circuit of claim 21, further comprising a current-to-voltage converter coupled between the current sense node pin and the current sense node, wherein the current-to-voltage converter configured to convert the current provided by the VCCS into a voltage.

23. The integrated circuit of claim 22, wherein the current-to-voltage converter is a resistor.

24. The integrated circuit of claim 23, wherein the resistor is an adjustable resistor.

25. The integrated circuit of claim 21, wherein the current generator further comprises a ramp unit coupled between the VCCS and the current sense node, wherein the ramp unit is configured to generate a ramping current starting at the current produced by the VCCS to a second value.

26. The integrated circuit of claim 21, wherein the VCCS comprises an operational transconductance amplifier (OTA).

* * * * *